United States Patent Office 3,211,707
Patented Oct. 12, 1965

3,211,707
PHOSPHOROUS COMPLEXES AS HARDENING ACCELERATORS FOR MIXTURES OF EPOXY COMPOUNDS AND POLYCARBOXYLIC ACIDS
Alex von Schulthess, Basel, Switzerland, assignor to Ciba Limited, Basel, Switzerland, a company of Switzerland
No Drawing. Filed Nov. 6, 1962, Ser. No. 235,868
Claims priority, application Great Britain, Nov. 29, 1961, 42,776/61
7 Claims. (Cl. 260—78.4)

This invention relates to hardenable epoxy resin compositions, and to the hardening of such compositions.

According to the invention there are provided hardenable compositions comprising at least one epoxy resin and, as a hardening accelerator therefor, at least one compound conforming to the general formula:

(I)

in which X is boron or aluminum and $R_1$, $R_2$ and $R_3$ are the same or different and represent monovalent hydrocarbon residues such as alkyl, aralkyl, aromatic or cycloaliphatic residues, which may or may not be substituted by one or more functional groups, such as halogen atoms or alkoxy groups, and $R_4$, $R_5$ and $R_6$ are the same or different and represent halogen atoms, $R_1$, $R_2$ and $R_3$ are preferably alkyl, especially alkyl of 2 to 4 carbons, or aromatic residues, e.g. phenyl. $R_4$, $R_5$ and $R_6$ may be chlorine or, preferably, when X is boron, fluorine.

These compositions may optionally contain also a conventional hardener for the epoxy resin.

It is known that compounds of the general formula:

(II)

in which $R_4$, $R_5$ and $R_6$ have the meanings assigned to them above (i.e. boron halides or aluminum halides) may be used as catalysts for the homopolymerisation of epoxy resins and as accelerators for the hardening of epoxy resins by conventional hardeners for such resins, such as anhydrides of di- or poly-carboxylic acids, or aromatic or aliphatic di- or poly-amines. It is also known that compounds which conform to the general formula:

(III)

wherein $R_1$, $R_2$ and $R_3$ have the meanings assigned to them above (i.e. phosphines) may also in certain instances be used as accelerators for the hardening of epoxy resins by certain of the commonly-used hardening agents such as anhydrides of dicarboxylic acids. An important disadvantage inherent in the use of the compounds of Formulae II and III for the hardening of epoxy resins, or for the acceleration of the hardening of such resins by conventional epoxy resin hardeners, is that mixtures of epoxy resins and these compounds, with or without conventional hardeners for epoxy resins, can be kept in a homogeneous fluid state for only a short time, even at room temperature. This disadvantage is also attendant upon the use of other hardeners or accelerators which have previously been used in the hardening of polyepoxides. Mixtures of epoxy resins and these hardeners or accelerators must then be used within a short time of their preparation.

A major advantage of the compositions of the invention is that while they are relatively stable at ambient temperatures, they may be very rapidly hardened by heating for a short time, e.g. to 100° C. or above. The reason for this important property would seem to be that while the compounds of Formula I are stable at low and moderate temperatures they dissociate, when heated, partly or completely to compounds of the Formulae II and III, and that while the compounds of Formula I are themselves inactive as accelerators or hardeners for epoxy resins, their breakdown products II and II are both highly efficient accelerators for the hardening of epoxy resins, for example by acid anhydrides, and also compounds of the Formula II are efficient agents for the polymerisation of epoxy resins even in the absence of a conventional hardener. The invention is however not limited to any particular theory or mechanism, since for whatever reason, the compositions of the invention have the outstanding property that they may be stored for comparatively long periods of time after their preparation without becoming cross-linked to a significant extent, but that, on heating to a suitable temperature, they very rapidly become hardened to give resins having frequently very valuable technical properties. The invention includes within its scope a process for making hardened epoxy resins which comprises heating a mixture of one or more epoxy resins with at least one compound which conforms to the general Formula I, with or without other compounds. The invention further comprises the cured products obtained by this process.

The compounds of Formula I may generally be simply prepared by reacting together compounds of the Formula II and compounds of the Formula III. This reaction may be performed by mixing the compounds of Formulae II and III in approximately equimolecular proportions, with or without the application of heat, alone or in the presence of an inert solvent, such for example as diethyl ether, a trialkyl phosphate such as trimethyl or triethyl phosphate, benzene, toluene, chloroform or carbon tetrachloride.

The compounds of general Formula I may be present in the compositions in an amount of about 0.01–20% by weight of the epoxy resins, and in making the compositions they may if desired be dissolved in either the resin or a conventional hardener for the resin, if such a hardener is to be present in the final composition, or in a previously-prepared mixture of epoxy resin and hardener. Alternatively they may be first dissolved in an inert solvent, such as a trialkyl phosphate, before admixture with the epoxy resin and/or with a hardener.

The epoxy resins which may be used as components of the compositions of this invention include, for example, mono- and polyglycidyl ethers of mono- and poly-alcohols such as butyl alcohol, butane-1, 4-diol, or glycerol, or of mono- and poly-phenols, such as resorcinol, bis(4-hydroxyphenyl)-dimethyl-methane; condensation products of aldehydes with phenols (novolaks); polyglycidyl esters of polycarboxylic acids, such as phthalic acid; aminopolyepoxides, such as are for example obtained by the dehydrohalogenation of the reaction products of epihalohydrins and primary or secondary amines such as n-butylamine, aniline or bis(4-methylaminophenyl) methane; and the products which are obtained by complete or incomplete epoxidation of ethylenically-unsaturated cyclic or acyclic olefines and polyolefines. To obtain hardened resins having the required technical properties, it is generally necessary to have present in the compositions of the invention at least one bis- or poly-epoxide.

The conventional hardeners which may if desired be included in the compositions of this invention include amines and amides, e.g. aliphatic and aromatic primary, secondary and tertiary amines, such as mono-, di- and tributylamines, p - phenlyenediamine, bis(p - aminophenyl)-methane, ethylenediamine, diethylenetriamine, tetra(hydroxyethyl)diethylenetriamine, triethylenetetramine, Mannich bases, piperidine, guanidine and guanidine derivatives, such as phenylguanidine and diphenylguanidine, dicyandiamide, aniline-formaldehyde resins, urea-formaldehyde resins, melamine-formaldehyde resins, polymers of amino-styrenes, and polyamides, e.g. those which are obtained from aliphatic polyamines and di- or trimerised unsaturated fatty acids; isocyanates; isothiocyanates; polyhydric phenols, such as resorcinol, hydroquinone, and bis (4 - hydroxyphenyl)dimethylmethane; p - benzoquinone; phenol-aldehyde resins, oil-modified phenol-aldehyde resins; and reaction products of aluminum alcoholates or phenolates with tautomerically-reacting compounds of the aceto-acetic ester type.

The preferred such hardeners are polycarboxylic acids and their anhydrides, such for example as phthalic anhydride, methylendomethylenetetrahydrophthalic anhydride, dodecenylsuccinic anhydride, hexachloroendomethylenetetrahydrophthalic anhydride and endomethylenetetrahydrophthalic anhydride and their mixtures, and maleic and succinic anhydrides.

The compositions of this invention may also contain fillers, plasticisers, or colouring agents, for example asphalts, bitumen, glass fibres, mica, quartz powder, cellulose, kaolin, finely-divided kieselguhr, finely divided silica, such as that available under the trademark Aerosil, or metal powder.

The compositions may be used in the filled or unfilled state e.g. in the form of solutions or emulsions, as textile auxiliaries, laminating resins, varnishes, lacquers, dipping resins, casting resins, moulding compositions, and encapsulating, coating filling, and packing materials, adhesives and the like, as well as for the preparation of such materials.

The following examples illustrate the invention.

EXAMPLE I 15 gm. of a polyglycidyl ether (hereinafter termed "polyepoxide A") prepared in a known way by the reaction of (4,4'-dihydroxydiphenyl)-dimethylmethane with epichlorohydrin under alkaline conditions, and having a molecular weight of about 400 and an epoxide equivalent of 190–195 were treated with a solution of 0.75 gm. of the complex compound obtained as described below in 1 gm. of triethyl phosphate and the mixture was heated at 120° C. for 12 hours and then for 3 hours at 140° C. At the end of this time, a light yellow, hard, insoluble and infusible solid was obtained.

The complex may be obtained in either of the following ways:

(A) Triphenyl phosphine (5.2 gm., 0.02 mole) was dissolved in ether (20 ml.) and boron trifluoride etherate (2.8 gm., 0.02 mole of $BF_3$) was added slowly. The white precipitate formed was filtered off and dried; 3.8 gm. of the complex compound $(C_6H_5)_3P:BF_3$ were obtained, and evaporation of the filtrate yielded a further 2.5 gm.

(B) Triphenylphosphine (5.2 gm., 0.02 mole) was dissolved in chloroform (20 ml.) and boron trifluoride gas was passed into the cooled solution until the increase in weight reached 1.4 gm. (corresponding to the uptake of 0.02 mole of $BF_3$). Evaporation of the solvent in vacuo gave the same triphenyl phosphine-boron trifluoride complex compound (6.4 gm.).

EXAMPLE II

The activity of the complex compound described in Example I as a latent accelerator for the hardening of an epoxy resin by an acid anhydride was demonstrated in the following way. Mixtures containing 25 gm. of "polyepoxide A," 21.5 gm. of methylendomethylenetetrahydrophthalic anhydride and a small amount of accelerator (0.5 gm. of triphenyl phosphine or 0.64 gm. of the complex compound, dissolved in 1 gm. of triethyl phosphate) were prepared. Test samples were heated to various temperatures, and their "gel times" (as measured on a "Techne" gelation timer) were determined. The results, given in Table I, show that the use of the complex compound gives a very long "pot-life" even at 80° C., but a short "gel time" at higher temperatures.

*Table I*

| Accelerator | Temperature | | | |
|---|---|---|---|---|
| | 80° C. | 100° C. | 120° C. | 140° C. |
| $Ph_3P$ | 45 min | 23 min | 14 min | 9 min. |
| $Ph_3P:BF_3$ | 56 hours | 372 min | 141 min | 69 min. |
| None | | | >20 hours | >20 hours |

EXAMPLE III

A boron trichloride-triphenylphosphine complex compound was prepared essentially as described in Example I, by reaction of equimolecular amounts of triphenylphosphine and boron trichloride. The same mixture of polyepoxide and anhydride as used in Example II was mixed with an amount of the $(C_6H_5)_3P:BCl_3$ complex compound which contained an amount of combined triphenyl phosphine equal to that used in Example II. The gelation times of the epoxide/accelerator mixtures were measured at 80° C. and 100° C., the results are shown in Table II.

*Table II*

| Accelerator | Temperature | |
|---|---|---|
| | 80° C. | 100° C. |
| $(C_6H_5)_3P$ alone | 45 min | 23 min. |
| $(C_6H_5)_3P:BCl_3$ complex | 129 min | 38 min. |
| None | 20 hours | 20 hours. |

EXAMPLE IV

Triphenyl phosphine (5.2 gm., 0.02 mole) and aluminum chloride (2.6 gm., 0.02 mole) were each dissolved in 20 ml. ether and the two solutions mixed. A white precipitate was initially formed but redissolved on stirring. The ether was allowed to evaporate at room temperature and the final traces removed in a desiccator evacuated by means of a filter pump. By this means the complex $(C_6H_5)_3P:AlCl_3$ was obtained in the form of a viscous liquid solidifying at about 20° C.

To the mixture of polyepoxide and anhydride used in Example II was added 0.75 gm. $(C_6H_5)_3P:AlCl_3$ suspended in 1 gm. benzene. The gel time of the resulting composition at 120° C. was 28 minutes.

EXAMPLE V

Another complex was prepared as a white solid by addition of tri-n-propylphosphine (1.2 gm.) to boron trifluororide etherate (1.07 gm.).

A mixture of "polyepoxide A" (25 gm.), methylendomethylenetetrahydrophthalic anhydride (21.5 gm.) and this complex (0.7 gm.) gelled in 163 minutes at 120° C.

EXAMPLE VI

A fifth complex was prepared by the addition of boron fluoride etherate (28.4 gm.) to tri-n-butylphosphine (40.4 gm.), with cooling and stirring. Evaporation of low-boiling materials gave a pink solid, which on distillation gave white crystals (M.P. ca. 50° C.; B.P. 70–73° C./0.02 mm. Hg), having the following elementary analysis.

Found: C, 52.93; H, 10.12; P, 11.62; B, 3.89%. Calc. for $C_{12}H_{27}BF_3P$: C, 53.30; H, 10.06; P, 11.57; B, 3.99%.

The gel times of mixtures of this complex (0.67 gm.), "polyepoxide A" (25 gm.) and methylendomethylenetetrahydrophthalic anhydride (21.5 gm.) are shown in Table III.

Table III

| Temperature (° C.) | 80 | 100 | 120 | 140 |
|---|---|---|---|---|
| Gel time (min.) | 798 | 200 | 68 | 28 |

EXAMPLE VII

A mixture of "polyepoxide A" (100 gm.), methylendomethylenetetrahydrophthalic anhydride (73.3 gm.) and the complex described in Example I (4 gm.) was cast into a mould and heated for 1 hour at 120° C. A casting having a heat deflection temperature (measured according to ASTM D648–56) of 148.5° C. resulted.

What is claimed is:

1. A heat-hardenable resin composition, which comprises (1) a 1,2-epoxy compound having a 1,2-epoxy equivalency greater than 1, (2) as hardener therefor a polycarboxylic acid anhydride, and (3) as hardening accelerator a compound of the formula

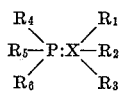

wherein X is a member selected from the group consisting of boron and aluminum, $R_1$, $R_2$ and $R_3$ each are members selected from the group consisting of fluorine and chlorine with the proviso that $R_1$, $R_2$ and $R_3$ are always identical, and $R_4$, $R_5$ and $R_6$ each are members selected from the class consisting of alkyl group with 2 to 4 carbon atoms and the phenyl group with the proviso that $R_4$, $R_5$ and $R_6$ are always identical.

2. A composition as claimed in claim 1, wherein the accelerator (3) has the formula

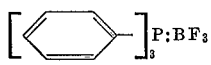

3. A composition as claimed in claim 1, wherein the accelerator (3) has the formula

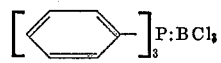

4. A composition as claimed in claim 1, wherein the accelerator (3) has the formula

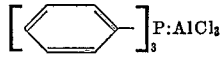

5. A composition as claimed in claim 1, wherein the accelerator (3) has the formula

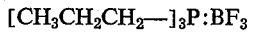

[CH$_3$CH$_2$CH$_2$—]$_3$P:BF$_3$

6. A composition as claimed in claim 1, wherein the accelerator (3) has the formula

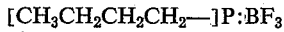

[CH$_3$CH$_2$CH$_2$CH$_2$—]P:BF$_3$

7. A composition as claimed in claim 1, wherein the polycarboxylic anhydride (2) is methyl-endomethylenetetrahydrophthalic anhydride.

References Cited by the Examiner

UNITED STATES PATENTS

| 2,768,153 | 10/56 | Shokal | 260—78.4 |
| 2,921,929 | 1/60 | Phillips et al. | 260—78.4 |
| 2,992,193 | 7/61 | Porret et al. | 260—78.4 |

OTHER REFERENCES

Phillips et al.: Chemical Society Journal (London), pp. 146–162 (1945).

JOSEPH L. SCHOFER, *Primary Examiner.*

DONALD E. CZAJA, *Examiner.*

UNITED STATES PATENT OFFICE
CERTIFICATE OF CORRECTION

Patent No. 3,211,707                          October 12, 1965

Alex von Schulthess

It is hereby certified that error appears in the above numbered patent requiring correction and that the said Letters Patent should read as corrected below.

Column 6, line 19, the formula should appear as shown below instead of as in the patent:

$$[CH_3CH_2CH_2CH_2-]_3P:BF_3$$

Signed and sealed this 5th day of July 1966.

(SEAL)
Attest:

ERNEST W. SWIDER                      EDWARD J. BRENNER
Attesting Officer                         Commissioner of Patents